United States Patent [19]

Johnson

[11] Patent Number: 4,513,840
[45] Date of Patent: Apr. 30, 1985

[54] SOUND SUPPRESSION SYSTEM

[75] Inventor: Charles B. Johnson, Houston, Tex.

[73] Assignee: Combustion Engineering, Inc., Windsor, Conn.

[21] Appl. No.: 494,159

[22] Filed: May 13, 1983

[51] Int. Cl.³ .............................................. B64F 1/26
[52] U.S. Cl. ................................................... 181/210
[58] Field of Search .............. 181/210, 202, 205, 284, 181/200

[56] References Cited

U.S. PATENT DOCUMENTS 4,146,112  3/1979  Usry .................................. 181/202
4,274,506  6/1981  Blomgren et al. .................. 181/210

OTHER PUBLICATIONS

Egan, Concepts in Architectural Acoustics, pp. 91 to 94.

Primary Examiner—L. T. Hix
Assistant Examiner—Brian W. Brown
Attorney, Agent, or Firm—Troxell K. Snyder

[57] ABSTRACT

A sound suppression system for use with air breathing machinery, (10, 12) includes a solid barrier (18) supported (28) above an earthen dike (26). Sound (16) from the machinery (10, 12) is reflected downward (116a) and absorbed. A slot (20), provided between the barrier (18) and the dike (26) allows a flow of fresh air (24) to pass under the barrier (18) to reach the machinery (10, 12). A swale (32) is also included to reflect sound upward (134) for dissipation in the upper atmosphere.

6 Claims, 2 Drawing Figures

SOUND SUPPRESSION SYSTEM

FIELD OF THE INVENTION

This invention pertains to a system for reducing the sound emanating from machinery and, more particularly, to a system for reducing sound emanating from machinery of the air breathing type.

BACKGROUND OF THE INVENTION

High noise level is a common and a necessary evil in any industrial environment wherein powerful machinery is utilized. This problem is most acute in applications where high pressure gases are created or handled and in those situations in which internal combustion engines are used to supply motive power. The sound emanating from such equipment is coming increasingly under the regulation of local and national environmental agencies and laws. Such regulation may be applied not only to those sounds deemed to be hazardous to nearby personnel, but also to those sound and noise levels merely perceived as annoying to nearby residents or bystanders.

The impact of such regulation as well as the prior art may be seen alongside major highways in the form of sound fences erected between the highway and a nearby population center. These prior art fences reduce the level of the sound perceived outside of the highway area by providing a complete vertical barrier to the flow of sound and air, at least near ground level, between the highway area and the nearby residences.

The use of prior art barriers, however, is unsuitable in those situations wherein air breathing machinery is the source of the undesirable sound. Air breathing machinery should be taken to include internal combustion engines, which must ingest a quantity of fresh air for the burning of liquid or solid fuels, heat exchange equipment which relies upon a flow of fresh air to which heat must be transferred, mass transfer devices which exchange volatile matter with incoming air, or other processes or equipment of the like. The prior art sound fence extends from ground level to a suitable height providing a complete block to airflow both into and away from the shielded machinery. This blockage can result in undesirable recycling of spent air to the intake of the air breathing machinery or process.

There is therefore a need for a sound suppression system particularly adapted for use with noisy, air breathing machinery.

SUMMARY OF THE INVENTION

The present invention provides a system for the suppression of sound emanating from air breathing machinery, such as a gas compressor driven by an internal combustion engine. A solid barrier, inclined from the vertical toward machinery is supported around the machinery by a series of vertical posts. The barrier is held above ground level, forming a slot through which air may flow under the barrier.

Sound reflected downward from the barrier encounters a dike with sloping sides which absorbs a portion of the reflected sound. The dike has a height at least as great as that of the bottom edge of the barrier, thus serving to block any direct sound path from the machinery. Sound not absorbed by the dike is reflected horizontally back toward the machinery where it encounters an upward sloping surface forming a part of a swale located between the dike and the machinery. Sound not absorbed by the upward sloping swale surface is reflected skyward and dissipated in the upper atmosphere.

The present invention also provides an optional solid fence, being approximately equal to the height of the dike, located outside of the barrier for further blocking and reflecting any sound which may escape under the barrier.

By utilizing the reflectivity of the barrier and the absorptivity of the dike and swale, the unwanted sound is either absorbed by multiple reflections or dissipated skyward. The combined result is an effective sound reduction system for encircling noise generating stationary machinery that does not impede the airflow necessary for the operation of the machinery.

BRIEF DESCRIPTION OF THE DRAWING FIGURES

DESCRIPTION OF THE PREFERRED EMBODIMENT

Figure 1:
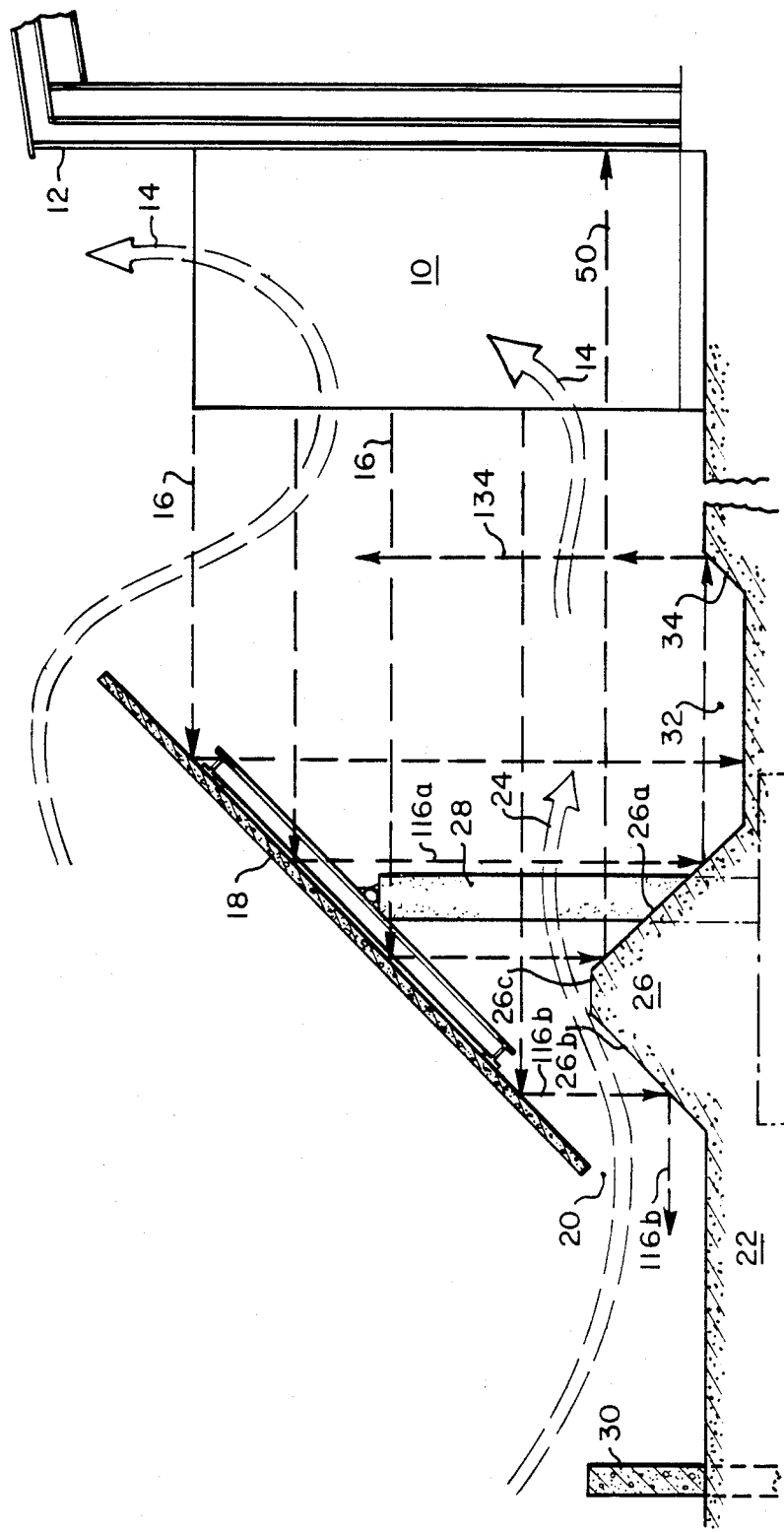
FIG. 1 is a cross sectional view of the sound suppression system.

Referring now to FIG. 1, the air-breathing, noise making machinery is shown typically as an engine cooler 10 affixed to one side of a corrugated steel building 12 which houses internal combustion engines for driving compressor machinery. The engine cooler 10 requires a flow of air designated generally by the arrows labeled 14. This flow of air 14 is required to maintain the efficiency of the cooler 10 and cannot be impeded by structures exterior to the cooler.

Sound generated by the machinery within the building 12 and by fans or other devices within the engine cooler 10 is designated as dashed lines 16 traveling horizontally outward from the engine cooler and building 10, 12. It is this horizontally traveling sound that forms the objectionable intrusion upon neighboring personnel and residences and which is suppressed by the system according to the present invention.

This system is disclosed in its preferred embodiment as a solid barrier 18 surrounding the machinery building and cooler 12, 10 and inclined from the vertical at an angle of 45°. The barrier 18, having an unbroken planar configuration rises to a height above that of the sound generating machinery, but does not extend downward to contact the ground as shown in FIG. 1. A slot 20 is shown between the bottom of the barrier 18 and the ground 22 for allowing a flow of fresh air designated by numeral 24 to pass therebetween. By maintaining the barrier 18 in a spaced apart relationship with the ground 22, the barrier does not block the air 24 from reaching the machinery 10, 12.

To prevent sound from escaping under the barrier 18 through the slot 20, a dike 26 is shown positioned beneath the barrier 18 and rising to a height at least as great as that of the lower end of the barrier 18. The dike is positioned in a spaced apart relationship with the barrier 18 and thus also permits the aforementioned flow of air 24. The sound barrier 18 is strengthened and held in position by a substantially vertical support 28 which is rigidly affixed in the ground 22 and to the underside of the barrier 18.

In operation, the horizontally outwardly traveling sound waves 16 strike the underside of the sound barrier 18 and are reflected vertically downward toward the dike 26 and ground 22. This reflection would preferably be enhanced by forming the barrier 18 of a hard, heavy material generally reflective of sound waves, such as concrete or metal. The dike 26 is shown as having sloping walls 26a and 26b rising to a elevated center portion 26c. Those sound waves 116a which are shown striking the inwardly facing sloped surface 26a of the dike 26 are partly absorbed by the dike 26 and partly reflected horizontally back toward the building 12. Preferably the dike would be made of a generally sound absorptive material, such as earth or clay, which would serve to eliminate the sound within the sound suppression system. By blocking any direct path for horizontally traveling sound waves 16, the sound suppression system results in the attenuation of the sound emanating from the air breathing machinery 10, 12 without restriction of the necessary airflow 14 for such machinery.

Also disclosed is an optional fence 30 shown located outside of the barrier 18 and the dike 26. This optional fence 30 is made of a solid material, such as concrete, generally reflective of sound and serves to redirect those sound waves, designated generally 116b which may escape under the barrier 18 by reflection on the outwardly facing sloped surface 26b of the dike 26. These sound waves 116b, although attenuated by their encounter with the sound absorptive dike surface 26b, may still be objectionable. Upon encountering the solid, sound reflective fence 30, these waves 116b would be reversed in direction and transmitted back against the sloping face 26b of the dike 26. The solid fence 30 has a height equivalent to that of the dike 26.

Also disclosed as a part of the sound suppression system according to the present invention is the swale designated generally by numeral 32. The swale 32 is an area of reduced depth disposed between the dike 26 and the machinery 10, 12. The swale is bounded on the outer side by the inwardly facing slop 26a of the dike 26 and on the inner side by an outwardly facing slope 34. Sound waves 116a striking the lower portion of the inward facing slope 26a of the dike 26 that are not absorbed but reflected horizontally back toward the machinery 10, 12 would encounter this outward facing swale surface 34 and be either absorbed or reflected skyward 134. In actual practice the swale 32 may be formed by excavating sufficient earth to construct the dike 26 thus not only complementing the function of the dike 26 and barrier 18, but also serving to provide the materials for the construction and the support thereof.

Figure 2:
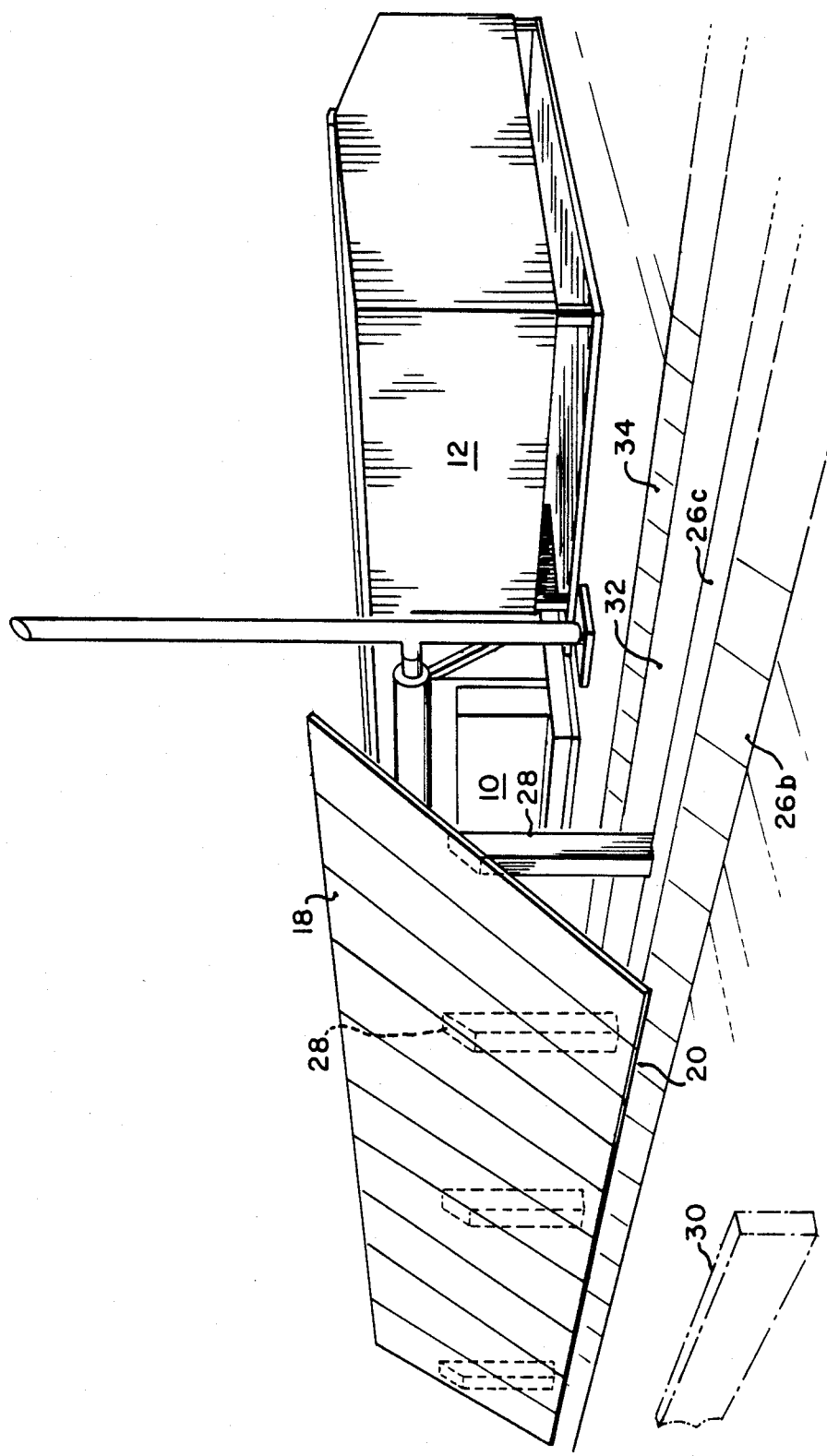
FIG. 2 is a view of the sound suppression system as it would appear to a viewer standing outside of the encircling barrier.

FIG. 2 shows a view of the sound suppression system according to the present invention as it would appear to an observer standing outside of the area bounded by the solid fence 30. The barrier appears as a continuous sloping wall encircling the offending machinery.

As can be seen from the drawing figures, especially FIG. 1, the horizontally traveling sound waves 16 generated by the air breathing machinery 10 are attenuated by multiple reflections between the sound barrier 18, the dike surfaces 26a, 26b, 26c, and the swale surface 34. Sound waves not absorbed upon encountering any of these sound absorptive surfaces are either re-reflected back into the system by the solid wall 30, the metal building 12, the engine cooler 10, or transmitted vertically 134 into the upper atmosphere where they may be dissipated according to the principles of sound transmission well known in the art.

The solid fence 30 has been designated as optional due to the small amount of sound 116b which may be expected to escape under the barrier 18. The choice would be made based on local requirements and sound intensity.

Typically, the airflow slot 20 beneath the sound barrier 18 would measure approximately three feet from the lower end of the sound barrier 18 to the surface of the ground 22. This would provide adequate airflow 14, 24 for the machinery 10, 12. The vertical supports 28 would be spaced as needed along the barrier 18 to provide adequate support against wind and/or static loading.

The system according to the present invention is therefore seen to provide a simple, effective control for reducing the sound generated by air breathing machinery without impeding the flow of air to such machinery. It is to be understood that the preferred embodiment is to be taken in an illustrative and not a limiting sense and that this disclosure is meant to encompass not only the embodiment illustrated herein, but also the equivalents thereof which would be apparent to one skilled in the art upon reviewing the foregoing specification and the appended claims and drawing figures.

What is claimed is:

1. A system for suppressing the sound emanating from ground based air breathing machinery, comprising
    a solid, sound reflective barrier having a height in excess of said machinery and being supported in a vertically spaced apart relationship with the ground, said barrier being of an unbroken planar configuration, inclined toward said machinery at an angle of approximately 45° from the vertical, and defining an airflow slot with the ground for permitting the flow of air therebetween;
    a plurality of vertical supports secured to said barrier for preventing the movement thereof; and
    a dike located beneath said barrier and having a height in excess of the height of the lower end of said barrier for absorbing and reflecting any sound reflected downward therefrom, said dike running the entire length of said barrier.

2. The sound suppression system as recited in claim 1, wherein the ground between said machinery and said dike defines a swale, said swale being disposed adjacent said dike beneath said barrier and having a sound absorbing, outwardly facing sloping surface opposite said dike for absorbing or reflecting any sound horizontally reflected from said dike.

3. The sound suppression system as recited in claim 2, further comprising a solid vertical fence, having a height substantially equal to the height of said dike and disposed on the opposite side of said barrier for reflecting back any sound escaping between said barrier and said dike.

4. The sound suppression system as recited in claim 2, wherein the barrier contains concrete.

5. The sound suppression system as recited in claim 3, wherein the barrier and the fence each contain concrete.

6. The sound suppression system as recited in claim 2, wherein the dike is constructed substantially of earth.

* * * * *